July 29, 1952  R. A. FLETCHER  2,605,070
PALLET STRUCTURE
Filed June 13, 1946  6 Sheets-Sheet 1
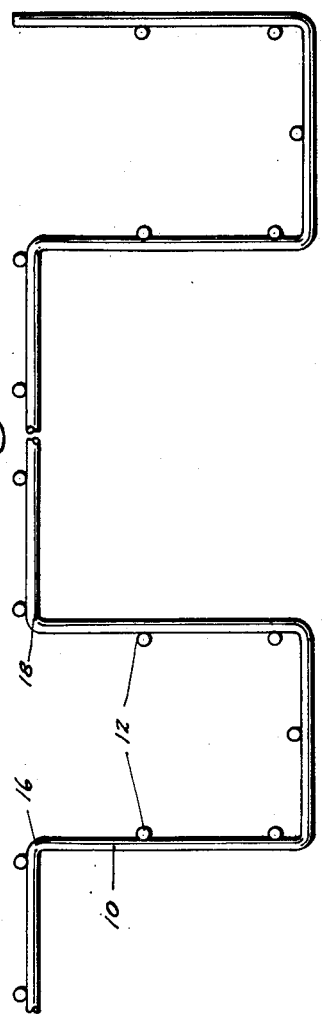
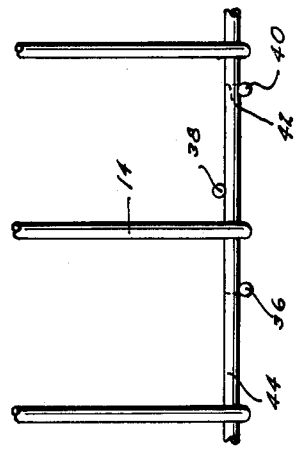
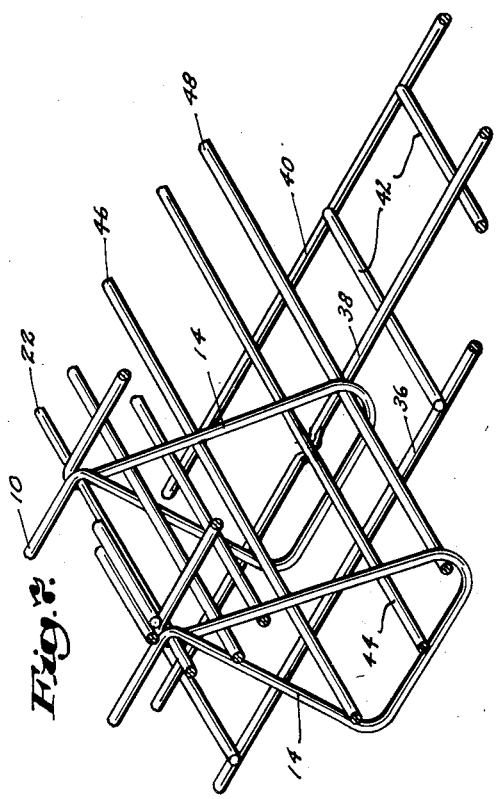
Inventor
Ralph A. Fletcher
by
Thomas H. Hamilton
Attorney July 29, 1952  R. A. FLETCHER  2,605,070
PALLET STRUCTURE Filed June 13, 1946  6 Sheets-Sheet 2

Inventor
Ralph A. Fletcher
by
Attorney

July 29, 1952 R. A. FLETCHER 2,605,070
PALLET STRUCTURE
Filed June 13, 1946 6 Sheets-Sheet 3
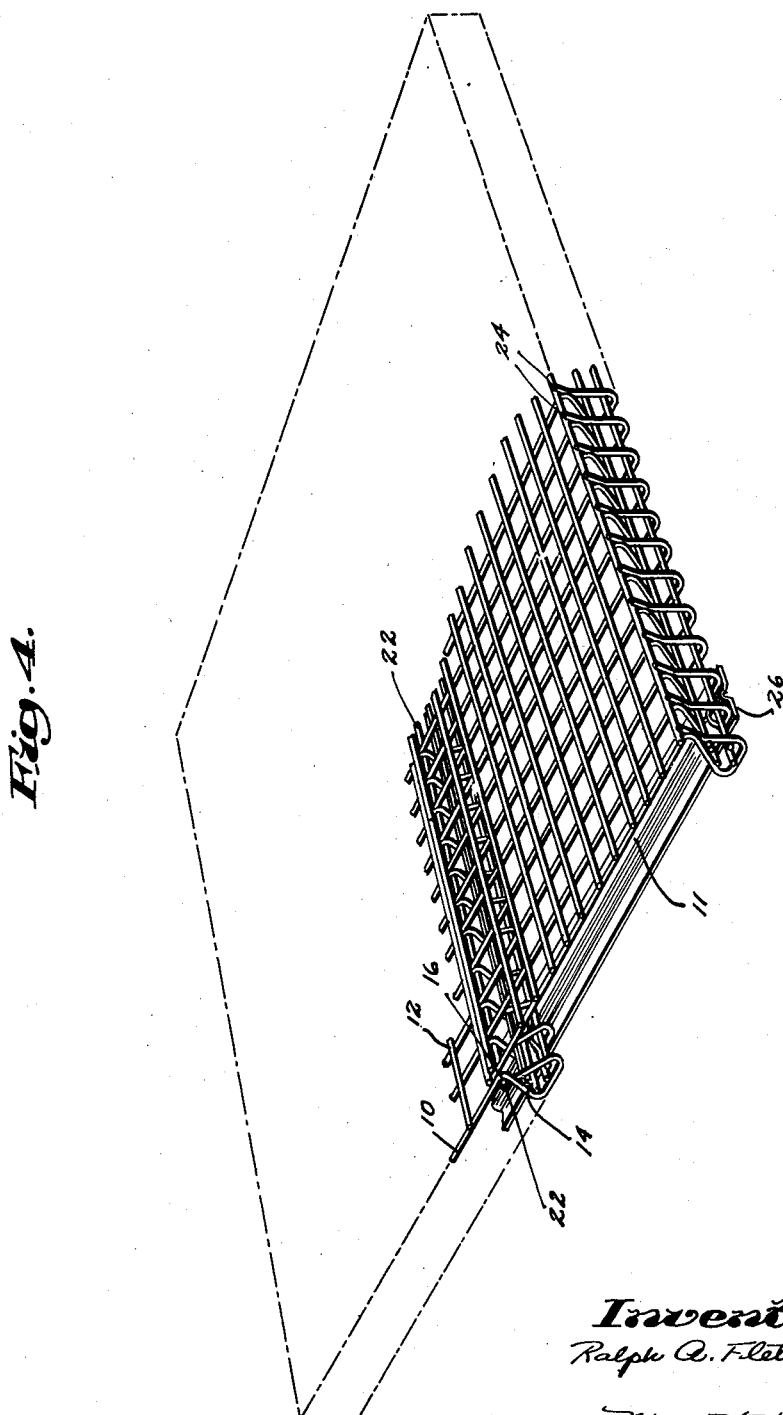

July 29, 1952
R. A. FLETCHER
2,605,070
PALLET STRUCTURE
Filed June 13, 1946
6 Sheets-Sheet 4
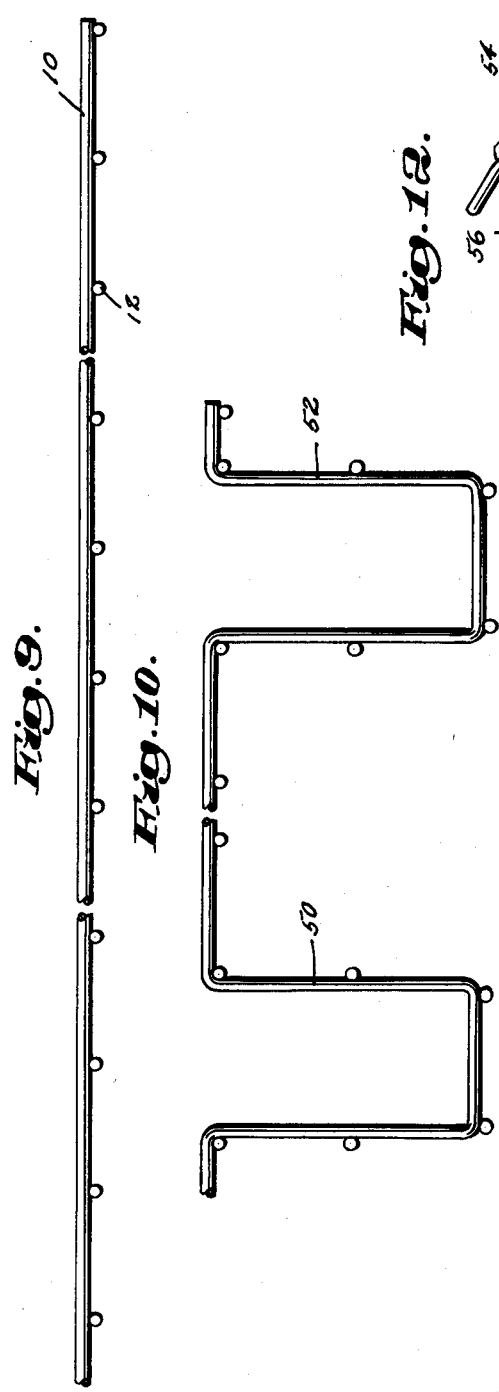
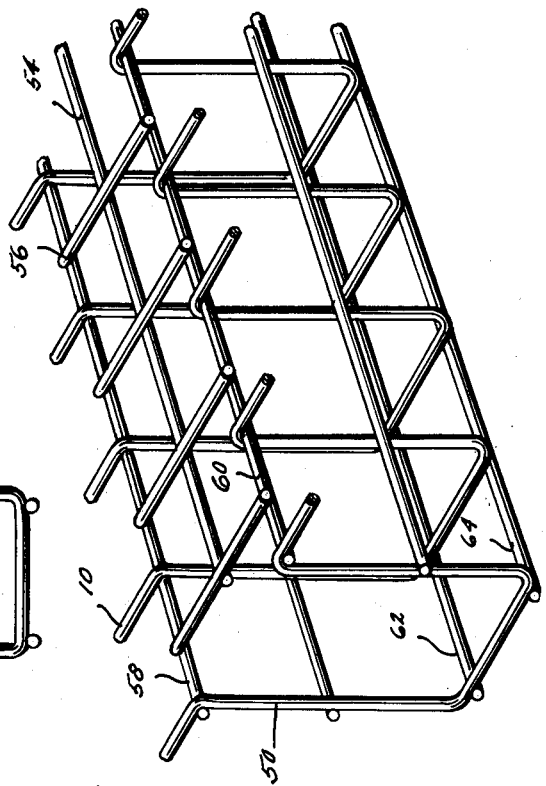
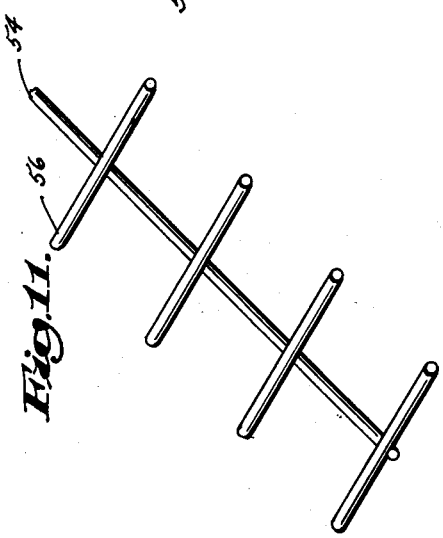
Inventor
Ralph A. Fletcher
by
Munn W. Hamilton
Attorney July 29, 1952 — R. A. FLETCHER — 2,605,070
PALLET STRUCTURE
Filed June 13, 1946 — 6 Sheets-Sheet 5
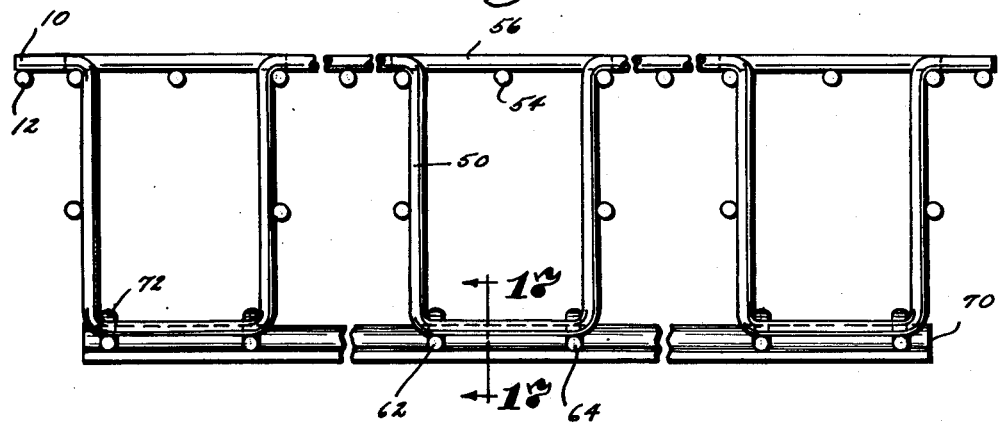
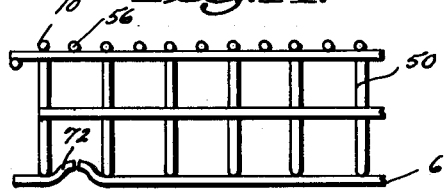 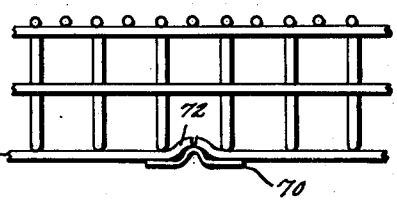
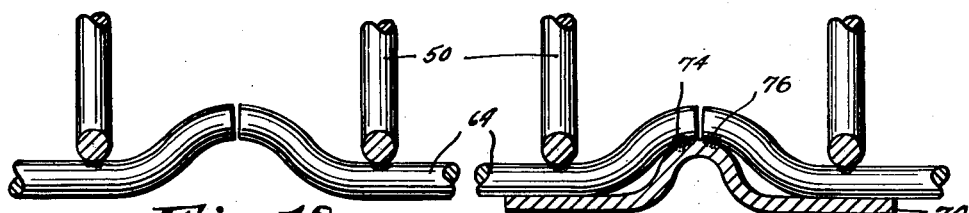
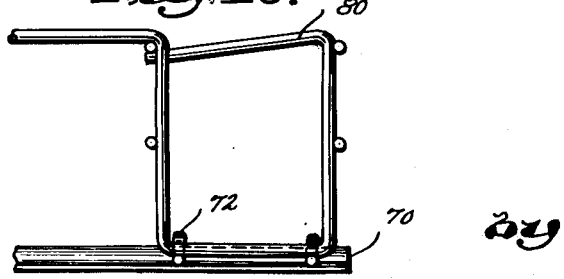

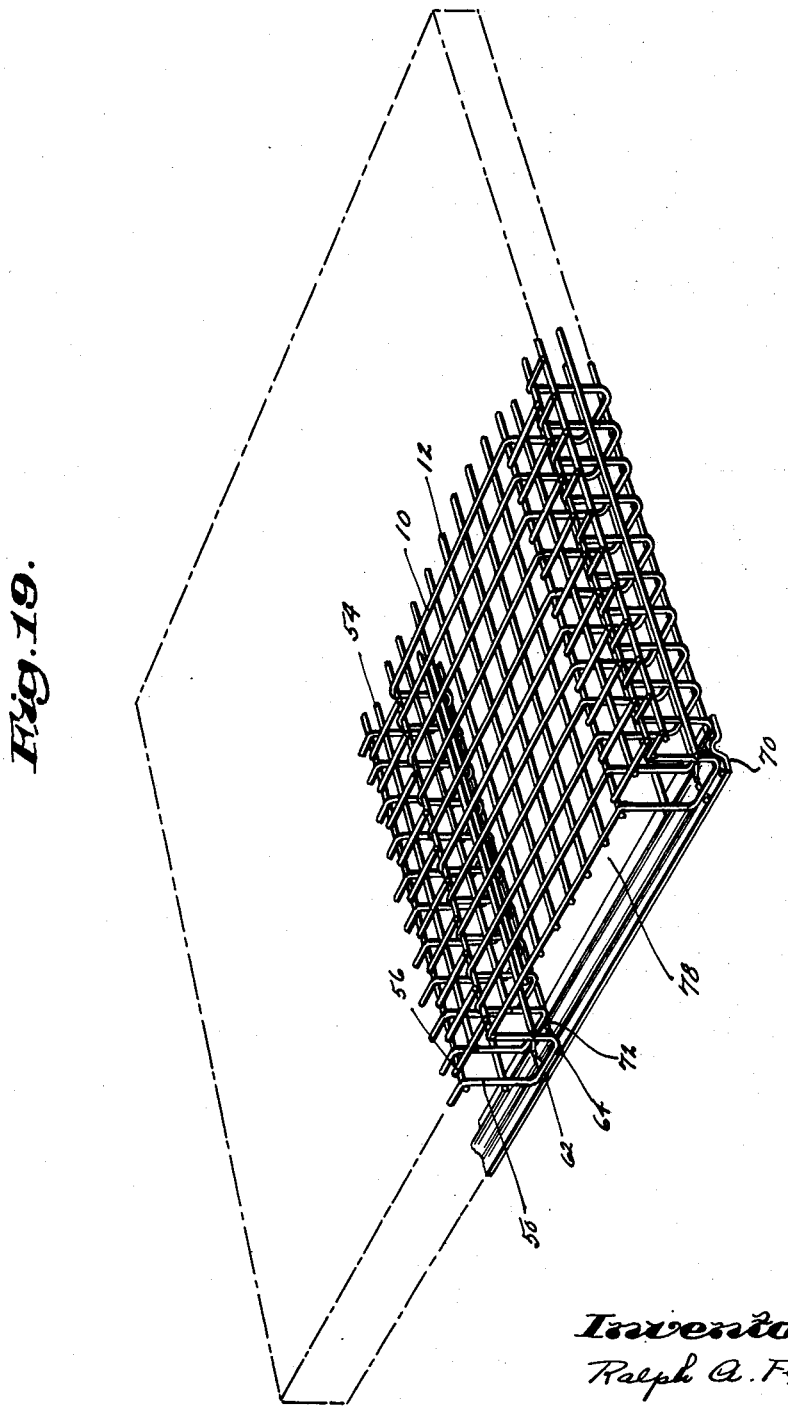

Patented July 29, 1952

2,605,070

UNITED STATES PATENT OFFICE 2,605,070

PALLET STRUCTURE

Ralph A. Fletcher, Westford, Mass.

Application June 13, 1946, Serial No. 676,446

10 Claims. (Cl. 248—120)

In handling crates, shipping cases and containers of various types, and particularly in stacking or storing these members upon one another in a compact and readily accessible manner, it is frequently the custom to "palletize" the goods, i. e. mount them upon pallets. Essentially a pallet consists of a spacing member, customarily made of wood, which presents open sides designed for use with a "chisel truck." This type of vehicle is equipped with a lifting bar or tongue arranged at its front end. The tongue member is inserted in the pallet openings and employed to pick up and stack loaded pallets.

Since devices of this nature may in some cases be used to support exceedingly heavy loads, they are required to have a great deal of strength and rigidity. Weight of the pallet, on the other hand, should be maintained at a minimum because of the need for ease of handling and other advantages.

An object of the invention, therefore, is to improve pallets and to devise a fabricated pallet body whose constituent elements are so organized and secured to one another as to develop outstanding light-weight character without unduly sacrificing overall strength and rigidity. Another object of the invention is to provide a fabricated supporting structure in which column-like supporting effects are achieved, and at some points a beam-type construction is simulated in order to combine both strength and rigidity in three dimensions. A further object is to design a cheap, simple and rapid method of building fabricated pallets. Other objects will appear from the following description of the invention.

In this connection I have found that excellent results may be obtained by fabricating pallets from various types of sheet materials. One desirable sheet material may, for example comprise a sheet of wire mesh in which a plurality of wires are laid crosswise upon one another in parallel spaced-apart relation. I find that wire mesh is well adapted to being pressed into a number of unique forms with which additional supporting elements may be secured permanently, thus forming an integrated whole of exceptional strength and lightness.

In the accompanying drawings:

Fig. 1 is a side elevational view of a sheet of wire mesh;

Fig. 2 is a side elevational view illustrating a step in forming the wire mesh;

Figs. 3, 4 and 5 illustrate further forming steps;

Fig. 7 is a perspective view of a modified type of pallet;

Fig. 8 is a detail view further illustrating a portion of a pallet similar to that indicated in Fig. 7;

Figure 3:
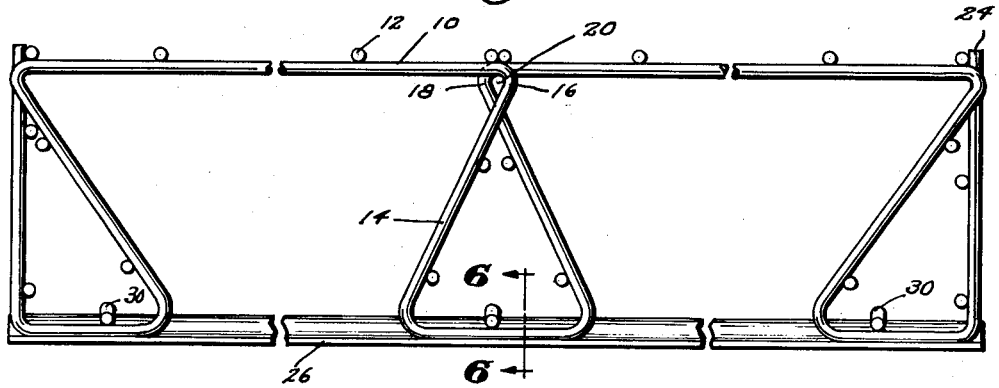
Figure 5:
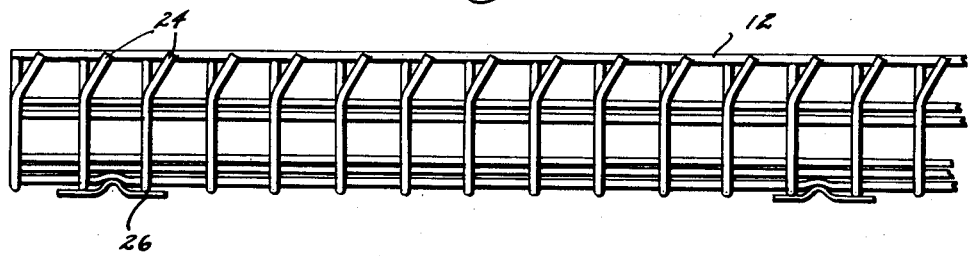

Figs. 9 to 19 inclusive illustrate another modification of pallet structure with its method of assembly.

The pallet structures shown in the above-noted figures may be considered as of two general types: one type is formed with triangular supporting members such as illustrated in Figs. 1–8 inclusive; the other type is formed with U-shaped supporting members such as are illustrated by Figs. 9–19 inclusive.

All of the figures in the drawings illustrate the fabrication of pallet structures from a sheet material of wire mesh and the following description deals with forming operations more or less specific to the use of wire mesh. It should be understood, however, that the invention is not limited to the use of wire mesh. Various other materials may be employed in constructing the pallet features disclosed. Thus I may employ reticulated sheet materials made of elements other than wire with these elements being interwoven or otherwise attached to one another. Similarly I may choose to utilize strips or sheets which are cut or punched to provide reticulated effects. I may even in some cases find it desirable to use a continuous sheet and it is further understood that any of these forms may be combined with separate supporting elements when so desired. In this connection also I may resort to the use of different metals such as aluminum, magnesium, light alloys and others. Likewise, I may go outside the field of metal to fabricate a pallet of sheet materials such as resins and plastics, plywood and other fibrous bodies.

Considering the method relating to the type of pallet shown in Figs. 1–8 inclusive, Fig. 1 indicates in elevation a sheet of wire mesh made up of a plurality of wires laid cross-wise upon one another in parallel spaced relation. Numeral 10 denotes bottom wires as viewed in Fig. 1 and numeral 12 denotes top wires. I may desire to assemble the individual wires in the manner noted, or I may prefer to employ sheets of the wire mesh which are manufactured in various sizes and gages of wire. I have found that excellent results are obtained by using a steel wire of 2 gage with the constituent wire elements occurring fairly close to one another, for example with a spacing of two inches. Welding is resorted to as a preferred method of securing contacting surfaces of the wires to one another throughout the pallet.

A sheet of this wire mesh, in some desired size, is molded or pressed along a line passing through the center of the sheet and also along lines passing through two opposite edges of the sheet to provide separate rows of U's as may be seen in Fig. 2. This operation may be conveniently carried out by means of forming dies, with the male die acting against the wires 12 so that the lower wires 10 constitute a series of U-shaped legs. Thereafter those U portions at the center of the wire mesh are pressed together into a position such as that noted in Fig. 3 to form triangles 14.

The upper bent portions 16 and 18, as they are forced inwardly, are slightly offset so that they pass by one another to define an opening as viewed in Fig. 3. Similar openings are formed by the other U's in the row. Through these openings may then be passed a tie rod member 22 as is illustrated in Fig. 4. The tie rod may, if desired, be welded to the bends, thus firmly locking the folded wire into a fixed triangular position as described.

Those portions of the wires 10 occurring between points of bending, together with the intervening wires 12, combine to form a supporting top surface of the pallet. This surface is hereinafter referred to as the "pallet deck."

Attention is directed to the U portions formed along the edges of the wire mesh as illustrated at the right-hand side of Fig. 2. These U portions are formed into a shape generally corresponding to a right triangle as may be more clearly seen at the right-hand side of Fig. 3. In this position, the extremities of the wires project slightly above the deck. Preferably the projecting ends are bent or offset into the position shown in Fig. 5, and thereafter secured by welding to the outside wire 12. This provides a pallet closed on two opposite edges with the remaining two edges including tongue openings 11.

It is pointed out that the legs of the triangle 14, by their opposed position, develop a substantial bracing effect, tending to resist lateral displacement of the pallet by forces acting against one side or the other, as viewed in Fig. 3. The tie rod 22 fixed at the tops of the triangles combines with the triangles to present a beam-type supporting effect extending all the way through the center of the pallet, thus further increasing its generally rigid character. Of even greater importance is the supporting strength which is developed by the combination of the tie rod, the triangles, and the deck with respect to forces applied downwardly against the pallet. Here it should be observed that the supporting action of each triangle may be likened to a column support where greatest strength is developed in a direction opposing the force of a load applied on a deck. There are thus achieved three-dimensional strength and rigidity, with a minimum amount of structural material being utilized, and with suitable tongue openings being preserved on two sides of the pallet occurring between the rows of triangles.

For some purposes I may desire to employ the pallet in the form now described. For other uses, I may desire to furnish and use additional base elements which either supplement the bottom surfaces of the triangles or take the place of them entirely. Fig. 3 further illustrates one type of base element consisting of corrugated bearing plates 26. Preferably, a group of these plates, for example three, are arranged in spaced-apart relation so that they extend along two opposite edges and a central portion of the pallet, in a parallel manner. One of these corrugated bearing plates is illustrated at the front of Fig. 4.

Figure 6:
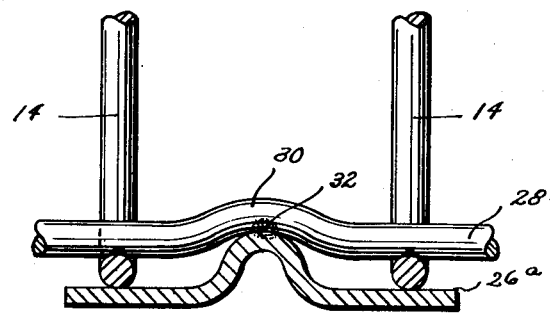
Fig. 6 is a detail cross-sectional view taken on the line 6—6 of Fig. 3.

Fig. 6 illustrates a preferred method of attaching bearing plates to the wire superstructure. As will be noted, the triangles 14 have their bottom surfaces lying upon the flat sides 26a of the bearing plates. The cross wires extending transversely across the bottoms of the triangles 14 are slightly upset to assume a bent or curved form as noted in Fig. 6. The upset wire may conveniently be referred to by the numeral 28 and the curved or bent portion is designated by the numeral 30. 32 indicates a spot of welding which unites the corrugated portion of the bearing plate to the bent portion of strip 26.

I may also desire to utilize the base elements made of wire in place of the corrugated strips for some types of materials handling. In Figs. 7 and 8 one form of wire bearing structure is illustrated in which the triangles 14 have arranged adjacent to their bottom sides a ladder-like structure made up of three longitudinal wires 36, 38 and 40 arranged in spaced-apart parallel relation and secured to one another by means of cross pieces 42.

The two outside wires 36 and 40 of the ladder-like structure are preferably located along points midway of the triangles in contact with the wire illustrated by numeral 44 in Fig. 7. The intermediate wire 38 of the ladder-like member is arranged more closely to the adjacent triangle and is upset in such a way that it passes under the wire 44 as well as below the wires numbered 46 and 48 in Fig. 7. It is pointed out that the wires 36 and 40 and the upset portion of wire 38 have bottom edges lying in the same plane (Fig. 8) as that occupied by similar portions of the bottom of the triangle 14, to provide an increased bearing surface.

Another general type of pallet characterized by U-shaped supporting portions has been dealt with in Figs. 9–21 inclusive. In this form of pallet a wire mesh similar to that already described is reversed so that the wires 10 occur at the top of the wire mesh and the wires 12 occur at the bottom as may be noted from an inspection of Fig. 9.

The wire fabric is subjected to a pressing operation as before, with the forming dies in this case bearing against the wires 10 and providing a centrally disposed row of U's, 50, and two other parallelly arranged rows of U's, 52, extending along opposite edges of the fabric or mesh. The centrally disposed U's are then knitted together along their tops by means of a ladder-like member made up of a longitudinal rod 54 across which is secured a plurality of cross pieces 56. The ladder-like member may conveniently be assembled as a separate unit and then laid upon the upper edges of the rods numbered 58 and 60 in Fig. 12. Welded in place in this manner, the tops of respective U's are locked together. The legs of the U's are prevented from being forced apart by the cross pieces 56 laid upon the wires 58 and 60. The upright legs of the U's are presented in a substantially vertical position so that they exert a maximum column-supporting effect to a heavy load. It will also be noted that the top edges of the cross pieces 56 are in the same plane as the top edges of wires 10, as viewed in Fig. 12, with the result that the ladder-like members combine with the top portions of the wires 10 to form a continuous deck.

As was the case with the triangularly shaped supporting elements, the legs of each U are braced against laterally directed forces, tending to collapse them; the U's occur in rows and are locked together by the ladder-like member so that bracing is achieved in two dimensions; and the upright character of the U's cooperates with these features to resist vertically applied forces. The net result is again three-dimensional rigidity and strength with a minimum of weight.

The wire members 62 and 64 in Fig. 12 are well suited to functioning as bracing members and may be so employed if desired. I may however prefer to use the corrugated bracing plate type of brace and this has been illustrated in Figs. 13-19 inclusive.

Numeral 70 denotes the corrugated bearing strips preferably extending approximately midway between the U's along two opposite edges of the pallet and at the center of the pallet. A bearing plate has been illustrated along one edge in Fig. 19 and this showing is intended to be illustrative of the use of three of these plates or any other number which may be desired to be employed.

I have further provided for the wires 62 and 64 being specially formed so as to more clearly conform to the contour of the plate corrugation and thus furnish a greater bearing area. This is done by upsetting the wires 62 and 64 to form bends as 72, which are thereafter cut to allow these wires to bridge across from the edges of the bearing plates to these corrugated tops without stretching or distorting the wires relative to the rest of the wire mesh body. Figs. 14 and 15 illustrate the wires in an upset and cut position with the bearing plate located directly under the cut ends. Figs. 16 and 17 further illustrate this operation and show two points of welding 74 and 76 by which the wire ends are secured to the corrugation.

As will be observed from an inspection of Fig. 19, the ladder-like members, for knitting together the tops of individual U's, are used at the edges as well as the center of the pallet, thus providing a means of easily and quickly finishing two closed edges.

The remaining two edges of the pallet present openings 78, defined by the rows of U's, into which the tongue of a truck may be inserted in lifting the pallet.

It is intended that the pallet structures of the invention may be modified in other ways, for example such as that illustrated in Fig. 18. This figure shows a type of closed pallet edge in which the wire mesh is bent over upon itself in sufficient length to form a box-like member 80 as shown. Another alternative arrangement comprises a fabricated pallet having supporting portions formed by methods such as those illustrated in Figs. 1-19 but with the difference that portions of the wire mesh or other deck material used are cut out at separated intervals. When the intervening portions are pressed or bent, there are thus obtained separated column-like members in place of continuously extending rib portions. These and various other changes are intended.

From the above description it will be evident that I have provided an exceedingly efficient method of producing a fabricated pallet body by which such members can be quickly and cheaply manufactured with a minimum of handling. It is pointed out that the various forming operations are extremely flexible and subject to changing requirements of varying character. Thus by using a wire mesh which is manufactured in structural sizes over a wide range of dimensions, it becomes possible to change pallet sizes very easily and to provide a flexible range of pallet sizes for particular sizes of packages to be palletized. The pallet structure thus produced is outstandingly light and yet develops unexpectedly fine strength features as well as ample stiffness.

It is intended that the various novel deck and supporting features may be embodied in other materials as noted above and within the limits defined by the appended claims.

I claim:

1. An improved pallet structure comprising a wire mesh deck formed of at least two sets of spaced-apart wire members laid crosswise upon one another, constituent wire members of one of the sets being bent along a plurality of transverse lines of bending to provide rows of depending supports for the deck, some of the wire members of the other of said sets extending along the bottoms of said depending supports, and means consisting of bridging elements secured to the deck so as to connect, one to another, those portions of the deck included between the rows of depending supports.

2. An improved pallet structure comprising a wire mesh deck formed of at least two sets of spaced-apart wire members laid crosswise upon one another, constituent wire members of one of the sets being bent along a plurality of transverse lines of bending to provide rows of depending supports for the deck some of the wire members of the other of said sets extending longitudinally of the rows and lying out of the plane of the said deck, those portions of the deck included between the rows of depending supports being crowded together, and means for holding in fixed relation to one another the said crowded together portions.

3. An improved pallet structure comprising a wire mesh deck formed of two sets of spaced-apart wire members laid crosswise upon one another, constituent wire members of one of the sets being bent along a plurality of transverse lines of bending to provide separated rows of depending supports for the deck some of the wire members of the other of said sets extending longitudinally of the rows, those portions of the deck included between the rows of depending supports being crowded together, and means consisting of wire elements for connecting one to another opposite portions of the deck included between respective rows of depending supports.

4. A structure as defined in claim 3 in which the connecting wire elements are arranged to lie in the plane of the deck.

5. A device as defined in claim 2 in which the depending supports are of a substantially triangular form and the holding means include wire elements lying in the plane of the deck.

6. A device as described in claim 2 in which the depending supports are of a substantially triangular form and the holding means include a plurality of wire elements which extend through apices formed by adjacent overlapping bent portions of the deck elements.

7. A device as described in claim 2 in which the depending supports present inclined legs and lower intervening base portions, the holding means consisting of a plurality of wires arranged in the plane of the deck and passed through apices of triangles defined by the legs, and a plurality of base plates solidly secured at the under sides of the base portions of the depending supports.

8. A device as described in claim 1 in which each of the depending supports is of a substantially U-shaped form.

9. A device as described in claim 1 in which each of the depending supports presents spaced-apart vertical legs and the holding means include a series of short lengths of wire lying in the plane of the deck and connecting together opposite bent portions of respective wire members.

10. A device as described in claim 1 in which the depending supports present spaced-apart vertical legs and lower intervening base portions, the holding means including a series of bridging strips lying in the plane of the deck and connecting together opposite bent portions of respective wire members, and a plurality of base plates solidly secured at the under sides of the base portions of the depending supports.

RALPH A. FLETCHER.

REFERENCES CITED

The following references are of record in the file of this patent:

UNITED STATES PATENTS

| Number | Name | Date |
| --- | --- | --- |
| 815,061 | Belloff et al. | Mar. 13, 1906 |
| 1,587,573 | Young | June 8, 1926 |
| 1,700,843 | Hayward | Feb. 5, 1929 |
| 2,190,065 | Griffin | Feb. 13, 1940 |
| 2,388,730 | Fallert | Nov. 13, 1945 |
| 2,412,184 | Ulinski | Dec. 3, 1946 |